(12) United States Patent
Lautenschläger et al.

(10) Patent No.: US 11,577,208 B2
(45) Date of Patent: Feb. 14, 2023

(54) PRESSURE VESSEL WITH HIGH-PRESSURE WINDOW

(71) Applicants: MWT AG, Heerbrugg (CH); Milestone S.r.l., Sorisole (IT)

(72) Inventors: Werner Lautenschläger, Auerstrasse (CH); Jens Lautenschläger, Heerbrugg (CH); Werner Scholze, Isny (DE)

(73) Assignees: MWT AG, Heerbrugg (CH); MILESTONE S.R.L., Sorisole (IT)

(*) Notice: Subject to any disclaimer, the term of this patent is extended or adjusted under 35 U.S.C. 154(b) by 788 days.

(21) Appl. No.: 16/529,074

(22) Filed: Aug. 1, 2019

(65) Prior Publication Data

US 2020/0041347 A1  Feb. 6, 2020

(30) Foreign Application Priority Data

Aug. 2, 2018 (DE) .................. 20 2018 104 455.9

(51) Int. Cl.
*B01J 3/00* (2006.01)
*G01N 21/03* (2006.01)
(Continued)

(52) U.S. Cl.
CPC .............. *B01J 3/004* (2013.01); *B01F 33/45* (2022.01); *B01J 3/04* (2013.01); *G01J 5/061* (2013.01);
(Continued)

(58) Field of Classification Search
CPC .... B01J 3/004; B01J 3/04; B01J 2219/00137; G01J 3/04; G01J 5/061; G01J 5/0205
See application file for complete search history.

(56) References Cited

U.S. PATENT DOCUMENTS

| | | | |
|---|---|---|---|
| 3,886,364 A | | 5/1975 | Walker et al. |
| 5,046,854 A | * | 9/1991 | Weller .................. G01N 21/03 |
| | | | 250/576 |
| 5,382,414 A | * | 1/1995 | Lautenschlager .. B01D 11/0219 |
| | | | 422/186 |

(Continued)

FOREIGN PATENT DOCUMENTS

| | | |
|---|---|---|
| CN | 1 02 004 000 A | 4/2011 |
| CN | 102004000 A | 4/2011 |

(Continued)

OTHER PUBLICATIONS

Machine translation of DE 10 2016 219 261 to Jackal et al.
(Continued)

*Primary Examiner* — David P Porta
*Assistant Examiner* — Jeremy S Valentiner
(74) *Attorney, Agent, or Firm* — The H.T. Than Law Group

(57) ABSTRACT

The present invention relates to a pressure vessel (1) having a pressure vessel wall (1a) which completely surrounds a reaction chamber (2) as a pressure space for the initiation and/or promotion of chemical and/or physical pressure reactions of a sample (P) to be heated which is accommodated in the reaction chamber (2), wherein the pressure vessel wall (1a) has an infrared-permeable high-pressure window (30) which extends away outward in a direction from the reaction chamber (2) and which is supported in the pressure vessel wall (1a) with respect to a pressure in the reaction chamber (2), wherein the pressure vessel (1) furthermore has an infrared to temperature sensor (40) which is situated directly opposite the high-pressure window (30), in order to measure the temperature of a sample (P), accommodated in the reaction chamber (2), during a pressure reaction through the high-pressure window (30).

19 Claims, 2 Drawing Sheets

(51) Int. Cl.
  *G01J 5/061* (2022.01)
  *G01J 5/02* (2022.01)
  *B01J 3/04* (2006.01)
  *B01F 33/45* (2022.01)
(52) U.S. Cl.
  CPC ............... *G01N 21/0317* (2013.01); *B01J 2219/00137* (2013.01); *G01J 5/0205* (2013.01)

(56) References Cited

U.S. PATENT DOCUMENTS

| | | | |
|---|---|---|---|
| 2012/0307862 A1 | 12/2012 | Crottereau et al. | |
| 2014/0117008 A1* | 5/2014 | Lautenschlaeger | H05B 6/806 |
| | | | 219/756 |
| 2014/0305170 A1* | 10/2014 | Fetner | D06B 23/10 |
| | | | 68/12.07 |

FOREIGN PATENT DOCUMENTS

| | | | | | |
|---|---|---|---|---|---|
| CN | 107702800 | A | * | 2/2018 | ................ G01J 5/00 |
| CN | 207600609 | U | * | 7/2018 | ................ G01J 5/00 |
| CN | 207600609 | U | | 7/2018 | |
| DE | 10 2016 219 261 | B3 | | 10/2017 | |
| EP | 2638965 | A2 | | 9/2013 | |
| GB | 2542813 | A | | 4/2017 | |
| JP | H05285363 | A | | 11/1993 | |
| JP | 2749428 | B2 | * | 5/1998 | ................ H01J 7/18 |
| WO | 9936960 | A1 | | 7/1999 | |

OTHER PUBLICATIONS

Machine translation of CN 1 02 004 000 to Kun et al.
European Search Report issued in connection with the corresponding European application No. 19 18 8252 dated Nov. 7, 2019.
Machine translation of EP 2638965 to Lautenschläger et al.
Machine translation of JP H05285363 to Sakamoto.
Machine translation of CN 102004000 to Univ Huazhong Science Tech.
Translated First Office Action issued in connection to the corresponding Chinese Application No. 201910711030.6 dated Apr. 20, 2022.
Machine translation of CN 207600609 to Shao et al.

* cited by examiner

PRESSURE VESSEL WITH HIGH-PRESSURE WINDOW

FIELD OF THE INVENTION

The invention relates to a pressure vessel having a pressure vessel wall which completely surrounds a reaction chamber as a pressure space for the initiation and/or promotion of chemical and/or physical pressure reactions of a sample to be heated which is accommodated in the reaction chamber.

BACKGROUND OF THE INVENTION

Pressure vessels of the types mentioned in the introduction are basically known from the prior art. For the purpose of temperature measurement, use is generally made of an infrared temperature sensor, which, because of the high pressure in the reaction chamber, is arranged outside the pressure vessel. In order that the infrared radiation emitted by the heated samples in the reaction chamber are, during a pressure reaction, effectively conducted to the infrared sensor for temperature measurement, it is known from the prior art to use a light-conducting tube which extends from the infrared sensor, provided outside the pressure vessel, as far as the vicinity of the reaction chamber. Thus, since the infrared temperature sensor is relatively far away from the reaction chamber, to be precise outside the pressure vessel, a relatively large, in particular tall, pressure vessel is the result.

SUMMARY OF THE INVENTION

It is thus an object of the invention to overcome the aforementioned disadvantages of the prior art, that is to say in particular to provide a pressure vessel having improved temperature measurement, which moreover is more compact.

The object is achieved according to the invention for the pressure vessel by the features of the independent claim. The dependent claims that refer back to said independent claim relate to advantageous refinements.

A pressure vessel according to the invention has a pressure vessel wall which completely surrounds a reaction chamber as a pressure space for the initiation and/or promotion of chemical and/or physical pressure reactions of a sample to be heated which is accommodated in the reaction chamber. The pressure vessel wall has an infrared-permeable high-pressure (infrared) window which extends away outward in a direction (or proceeding) from the reaction chamber and which is supported in the pressure vessel wall with respect to a pressure in the reaction chamber. The pressure vessel furthermore has an infrared temperature sensor which, with respect to the reaction chamber, is situated directly opposite the high-pressure window (from the outside), in order to measure the temperature of a sample, accommodated in the reaction chamber, during a pressure reaction through the high-pressure window.

In other words, the high-pressure window has the effect that the force caused by the pressure in the reaction chamber and acting in the direction of the infrared temperature sensor is diverted to the pressure vessel wall via the high-pressure window. Consequently, the region which extends from outside the pressure vessel as far as the high-pressure window is a region which is substantially not loaded by the pressure in the reaction chamber, with the result that the infrared temperature sensor may then be arranged in this region, specifically such that no components such as for example a light-conducting tube or a reflection tube need to be arranged between the high-pressure window and the infrared temperature sensor. It is thus possible for the infrared temperature sensor to bear directly against the high-pressure window or at least to be situated directly opposite the high-pressure window (at a distance therefrom), that is to say to be situated opposite said high-pressure window such that, for the measurement of the temperature by means of the infrared temperature sensor, no interposed components between the high-pressure window and the infrared temperature sensor need to be provided. Infrared radiation coupled out from the high-pressure window can thus pass directly to the infrared temperature sensor. It is consequently possible for the infrared temperature sensor to be brought closer in the direction of the reaction chamber, such that firstly, reliable temperature measurement by means of the infrared temperature sensor is realized, and secondly, the pressure vessel with the infrared temperature sensor is designed to be more compact.

The high-pressure window preferably bears directly against the reaction chamber. It is thus possible for the infrared temperature sensor to be brought even closer to the reaction chamber, so that both the temperature measurement and the compactness of the pressure vessel are optimized.

The pressure vessel wall, preferably a base of the pressure vessel, may have a bore, wherein the bore is open toward the reaction chamber, and wherein the high-pressure window is provided in the bore. It is thus possible for the high-pressure window to be easily provided in the pressure vessel wall, for example in that the high-pressure window is inserted into the bore from inside or outside the pressure vessel.

The bore may be a passage bore which leads to the outside of the pressure vessel, with the result that the high-pressure window is able to be inserted into the bore from outside the pressure vessel so as to extend away outward (proceeding from the reaction chamber). Here, the high-pressure window is preferably able to be inserted into the bore such that, as soon as it is situated in the bore, it is automatically supported in the pressure vessel wall. It is thus possible for the high-pressure window to be easily provided in the pressure vessel wall from outside the pressure vessel.

It is preferable for the high-pressure window and/or infrared temperature sensor to be designed to be screwed and/or inserted into the pressure vessel wall, in particular into the bore. The threaded engagement may in this case be formed to support the infrared window in the pressure vessel wall. It is consequently possible for the high-pressure window or the infrared temperature sensor to be easily provided in the bore or replaced.

The infrared temperature sensor may have an intermediate piece, for example a receiving tube, for receiving a sensor head of the infrared temperature sensor. By means of the intermediate piece, it is in particular possible for the infrared temperature sensor or the sensor head thereof to be easily provided in the bore. According to a preferred embodiment, the intermediate piece is designed to be screwed and/or inserted into the bore. The distal end of the intermediate piece may extend as far as the high-pressure window or be at a distance from the high-pressure window.

The pressure vessel wall may have a microwave-permeable region for the coupling-in of microwaves, wherein the high-pressure window and/or the infrared temperature sensor are/is provided adjacent to the microwave-permeable region. This prevents the high-pressure window and/or the infrared temperature sensor from influencing the microwave-permeable region. Moreover, the installation height of the pressure vessel is consequently reduced since the infrared temperature sensor and/or the high-pressure window are/is arranged in a region which is situated at the height of the microwave-permeable region.

The high-pressure window and the infrared temperature sensor may be formed as a unit or integrally with one another. It is thus possible for the high-pressure window and the infrared temperature sensor to be easily, that is to say in particular simultaneously, provided in the pressure vessel wall or removed therefrom.

The material of the high-pressure window is preferably permeable to infrared radiation in a wavelength range from 2.0 µm to 2.6 µm. In this way, it is possible to realize reliable temperature measurement by means of the infrared temperature sensor.

The material of the high-pressure window preferably has a crystalline structure. In this case, the crystalline structure is particularly suitable for the absorption of high pressures, with the result that the service life of the high-pressure window is increased and the infrared temperature sensor is effectively shielded from the high pressures of the reaction chamber by means of the high-pressure window. The material of the high-pressure window particularly preferably comprises sapphire, quartz, calcium fluoride and/or a PTFE material. Said materials are particularly advantageously suitable for absorbing the pressures of the reaction chamber and thereby shielding the infrared temperature sensor from said pressures or forces. Moreover, said materials are highly transparent to microwaves, and so the high-pressure window does not undergo self-heating because of microwave radiation. It is thus in particular possible for measurement errors to be avoided too.

The pressure vessel may furthermore have a cooling zone for cooling the infrared temperature sensor. This in particular prevents a situation in which heat released from the reaction chamber in the direction of the infrared temperature sensor does not influence the infrared temperature sensor. In this way, reliable temperature measurement by way of the infrared temperature sensor can consequently be achieved.

The cooling zone may be configured to cool the infrared temperature sensor actively and/or passively. For the active cooling, cooling elements operated by way of external energy can effectively dissipate large amounts of heat energy. The passive cooling can dissipate heat energy without an external supply of energy, for example in that regions of the infrared temperature sensor are correspondingly formed in terms of structure so as to support in particular the convective cooling. Exemplary configurations for passive cooling are surface-enlarging regions (cooling ribs, etc.) and/or bores for bringing about corresponding flows for the transporting-away of heat.

In a preferred embodiment for particularly effective cooling of the infrared temperature sensor, the cooling zone or the means for active cooling (active cooling element) has a flow device for cooling the infrared temperature sensor. It is particularly advantageous if the flow device is a fan. Alternatively or in addition, the cooling zone or the active element may have a Peltier element for cooling the infrared temperature sensor.

The cooling zone may have a tube which receives the infrared temperature sensor, wherein the tube has a passage bore which is provided such that, by way of the passage bore, an air flow is established for the cooling of the infrared temperature sensor. Since it is possible for the passage bore to be easily provided, it is thus possible for a passive cooling element for cooling the infrared temperature sensor to be easily provided. It is particularly preferable for the tube to be the intermediate piece, in particular the receiving tube. It is thus possible for effective cooling of the infrared temperature sensor to be brought about in a space-saving manner.

The invention will be described by way of example below on the basis of the figures, in which a preferred embodiment of the invention is illustrated. In the figures:

DETAILED DESCRIPTION OF THE PREFERRED EMBODIMENTS

Figure 1:
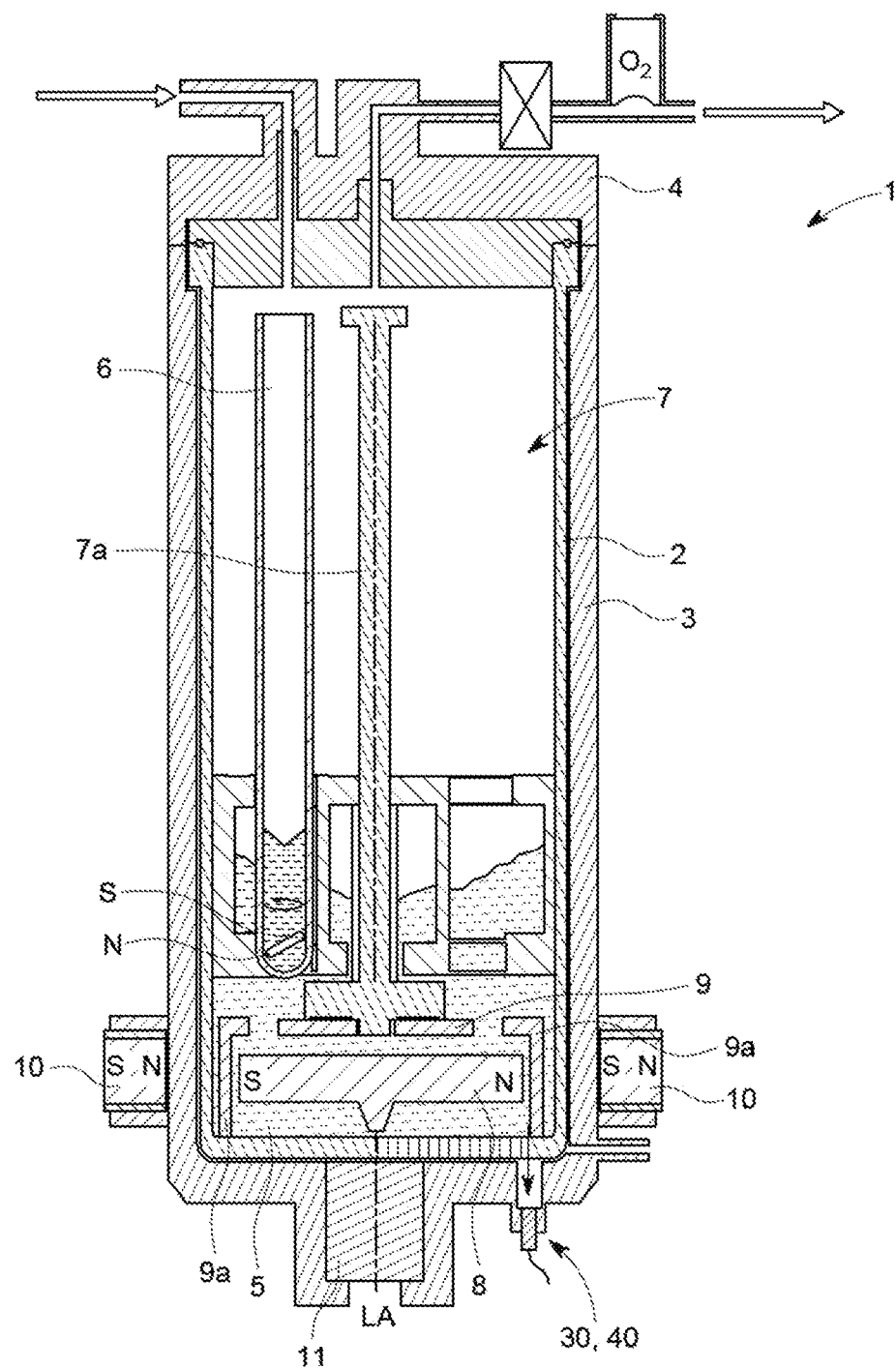
FIG. 1 shows an exemplary embodiment of the pressure vessel according to the invention in a sectional view.

FIG. 1 shows an exemplary embodiment of a pressure vessel 1 according to the invention, having a pressure vessel wall 1a, for accommodating samples h to be heated, for the initiation and/or promotion of chemical and/or physical pressure reactions on the samples P. The sample P may for example have solids such as sand, soil, earth and/or leaves. The pressure vessel 1 is however not restricted to a particular sample P. In particular, in the pressure vessel 1, any type of sample may be subjected to a pressure reaction and heating, especially samples with high viscosity or high solids fractions.

The pressure vessel 1 may be a (high-pressure) autoclave. The pressure vessel 1 or the pressure vessel wall 1a preferably consists of a high pressure-resistant material such as for example metal, preferably steel, particularly preferably a corrosion-resistant high-grade steel alloy. The pressure vessel 1 is in this case preferably formed such that it is able to be used at pressures up to at least 200 bar, preferably up to at least 500 bar, and at temperatures of up to and even above 300° C.

The pressure vessel 1 furthermore has a reaction chamber or a pressure space 2 for the initiation and/or promotion of the chemical and/or physical pressure reactions on the samples P. It can be seen that the pressure vessel 1 surrounds the reaction chamber 2, to be precise preferably on all sides. The sample or samples P is/are, for the sample processing, arranged in the reaction chamber 2, and is/are able to be removed from the latter preferably through an opening.

The pressure vessel 1 preferably has a (pot-shaped) lower part 3 and a cover part 4 which are able to be closed with respect to one another and which, in the closed state, surround the reaction chamber 2 on all sides. Here, the cover 4 closes the opening for the introduction and removal of the sample P, which opening is provided in the pressure vessel 1, that is to say in the lower part 3 of the pressure vessel 1. By means of the cover 4, the pressure vessel 1 and/or the reaction chamber 2 can consequently be opened and closed.

As can be seen in particular in FIG. 1, the reaction chamber 2 is furthermore designed to accommodate a liquid or base load 5. The liquid 5 is preferably water, but may also be or have any other highly microwave-absorbent liquid. In this case, the liquid 5 is provided in particular for heating or warming the sample P which is situated in the pressure vessel 1 or in the reaction chamber 2. This may be realized for example in that the sample P is at least partially surrounded by the liquid 5 and a microwave generator (not illustrated in more detail) warms the liquid 5 by microwave absorption, with the result that the sample P is indirectly warmed via the liquid 5. Here, the sample P may be provided in a sample vessel 6 such as for example a test tube.

Preferably, the pressure vessel 1 or the reaction chamber 2 is designed to accommodate two or more samples P. In a corresponding manner, provision may also be made of multiple sample vessels 6, that is to say at least one sample vessel 6, in order to accommodate in each case one sample P.

The pressure vessel 1 may furthermore have a sample holder 7, by way of which the sample vessel 6 can be held in the reaction chamber 2. The sample holder 7 preferably bears the at least one sample vessel 6 such that the sample vessel 6 is situated in the liquid 5. The sample holder 7 is in particular designed for the placement into the reaction chamber 2, and the removal again therefrom, of the at least one sample P or the at least one sample vessel 6, for example via a handle 7a.

The pressure vessel 1 may furthermore have a magnetic disk 8 which is mounted in the reaction chamber 2 and is rotatable about an axis of rotation. The liquid 5 can be stirred by means of the magnetic disk 8, for example via passage bores provided in the magnetic disk 8 or other fluid mechanical structures, such as for example stirring blades. For the purpose of driving the magnetic disk 8, provision may be made of electromagnets 10 which are uniformly distributed about the above-mentioned axis of rotation or about the circumference of the reaction chamber.

The at least one electromagnet 10 is actuated in order that a magnetic field which rotates (in a circle) is formed such that the magnetic disk 8 rotates about its axis of rotation and thereby stirs the liquid 5. The magnetic disk 8 is in this case formed in a manner corresponding to a rotor of a synchronous or stepper motor. The at least one electromagnet 10 is preferably designed in a manner corresponding to a stator of a synchronous or stepper motor. Instead of the magnetic disk 8, the pressure vessel 1 may also have any other stirring means for stirring the liquid 5, for example a stirring bar which is mounted on a stirring shaft.

As an alternative to the electromagnet 10, the pressure vessel 1 may also have some other magnet arrangement, for example a rotatably provided permanent magnet which is arranged preferably outside the pressure vessel 1, such that the rotation of the permanent magnet results in the rotating magnetic field for driving the magnetic disk in rotation being generated. The above statements concerning the electromagnet 10 apply analogously to a magnet arrangement of said type.

It can furthermore be seen that the pressure vessel 1 may have a plate or a pedestal 9 which is provided in the reaction chamber 2 and which is permeable to the liquid 5, for example via passage openings provided in the plate 9. Here, the plate 9 may define, together with the reaction chamber 2, in particular with the base of the reaction chamber 2, a space in which the magnetic disk 8 is mounted. For the purpose of forming said space, the plate 9 may be placed in the reaction chamber 2 and/or connected to the side walls of the reaction chamber 2 (for example via an edge or a projection). Alternatively, the plate may be connected to the base of the reaction chamber 2 via side walls 9a which extend away from the plate 9. It is preferable for the plate 9 to be produced from a ceramic material such as for example silicon carbide (Sic). Since these materials are highly microwave-absorbent, it is possible for the plate 9 provided in the liquid 5 to be heated by means of microwave radiation, so that the liquid 5 is heated both directly via microwave absorption and indirectly via the release of heat from the plate 9.

Figure 2:
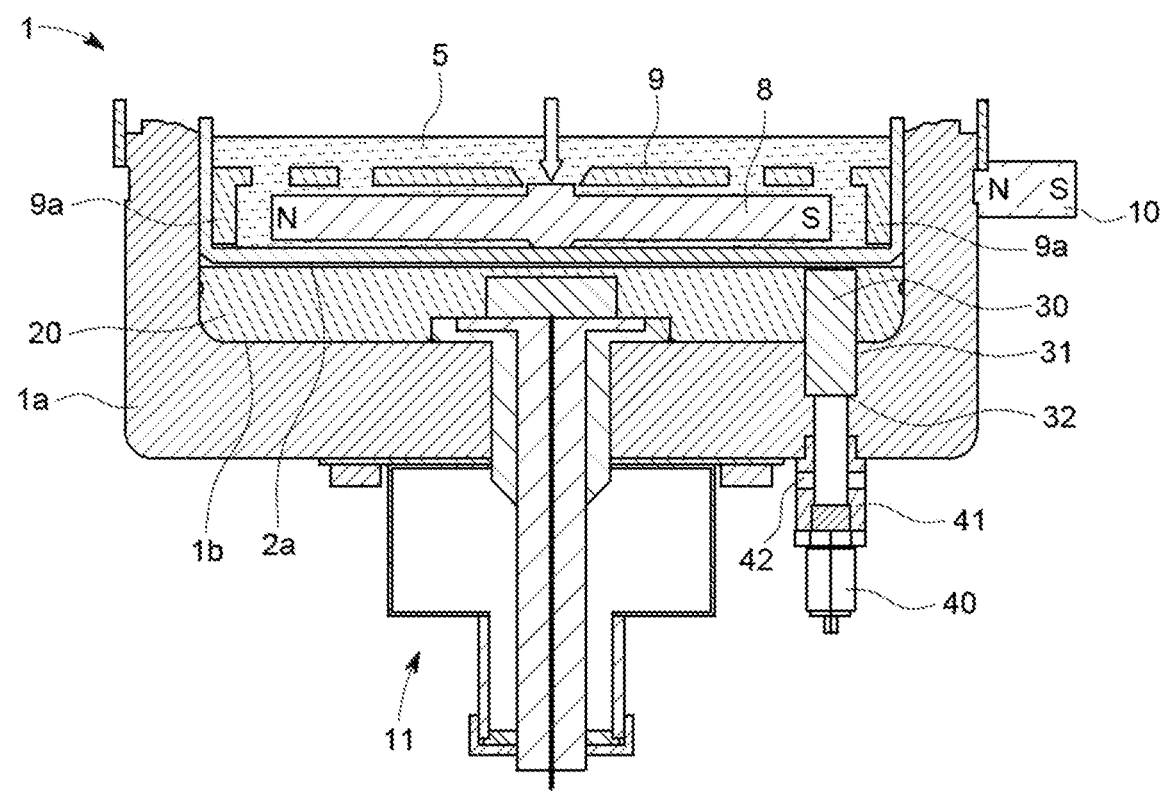
FIG. 2 shows a detail view of a part of the pressure vessel shown in FIG. 1.

As can be seen clearly in FIG. 2, between the (outer) base 2a of the reaction chamber 2 and the (inner) base 1b of the pressure vessel 1, provision may be made of a base piece 20 on which the reaction chamber 2 bears. Preferably, the base 20 is produced from a high pressure-resistant material, such as for example PTFE. Moreover, it may be provided that the base piece 20 completely fills the space between the base 2a of the reaction chamber 2 and the base 1b of the pressure vessel 1.

The pressure vessel 1 furthermore has a microwave-permeable region 11, via which microwaves can, for example by means of an antenna provided in the microwave-permeable region 11, be coupled into the reaction chamber 2, preferably via the base piece 20. The microwave-permeable region 11 is preferably provided centrally with respect to the pressure vessel base 1b. The invention is however not restricted here to heating by means of microwaves. It is also possible for the samples P to be heated by means of other heating means, such as for example a radiant heater.

The pressure vessel 1 furthermore has an infrared-permeable high-pressure window 30 which is provided in the pressure vessel wall 1a. As can be seen in particular in FIG. 2, the high-pressure window extends away outward, or to the outside of the pressure vessel 1, in a direction (proceeding) from the reaction chamber 2 and is supported in the pressure vessel wall 1a with respect to a pressure in the reaction chamber 2. It may be provided in particular that the high-pressure window 30 extends both in the base piece 20 and in the pressure vessel wall 1a. Preferably, provision is made for the high-pressure window 30 to extend only in the pressure vessel wall 1a and/or in the base piece 20.

The high-pressure window 30 may furthermore bear directly against the reaction chamber 2 or against the base 2a thereof. The base piece 20 may for example have a passage bore through which the high-pressure window 30 extends so as to bear directly against the reaction chamber 2. Alternatively, it may however also be provided that the high-pressure window 30—as illustrated in FIG. 2 by way of example—is provided in the base piece 20 in a blind bore, that is to say the bore in which the high-pressure window 30 is provided does not completely pass through the base piece 20 in the direction of the reaction chamber 2.

The high-pressure window 30 can be supported in the pressure vessel wall 1a for example in that the high-pressure window 30 is supported in a bore 31 provided in the pressure vessel wall 1a, preferably provided in the base 1b of the pressure vessel 1. The bore 31 is in this case open toward the reaction chamber 2 and/or toward the base piece 20. The support of the high-pressure window 30 in the bore 31 may be realized for example in that, in the bore 31, provision is made of a step 32 on which the high-pressure window 30 bears. It is thus possible, for example, for the high-pressure window 30 to be placed in the bore 30 from inside the pressure vessel 1 so as to bear on the step 32. During a pressure reaction in the reaction chamber 2, a pressure thus acts on the high-pressure window 30, with the resulting force being transmitted from the high-pressure window 30 to the step 32 and thus to the pressure vessel wall 1a.

The bore 31 may in particular be formed as a passage bore which leads to the outside of the pressure vessel 1. In this way, the high-pressure window 30 may also be inserted into the bore from outside the pressure vessel 1 such that, proceeding from the reaction chamber 2, the high-pressure window 30 extends away to the outside of the pressure vessel 1. For example, the high-pressure window 30 may thus be screwed into the pressure vessel wall 1a, in particular into the bore 31, from inside or outside the pressure vessel 1. In this way, a thread of the high-pressure window 30 which engages with a thread of the bore 31 may be designed to serve as a support for the high-pressure window 30 in the pressure vessel wall 1a or in the bore 31. Here, the step 32 may be provided additionally for the support or even be dispensed with.

The high-pressure window 30 preferably has a shape which corresponds to the bore 31. Preferably, the high-pressure window 30 is of solid form, that is to say in particular without cavities. The high-pressure window 30 may be of column-like and/or block-like form. In particular, the high-pressure window 30 may have any structure which is suitable for being inserted into the pressure vessel wall 1a such that, in the pressure vessel wall 1a, in particular in the bore 31, said window comes at least into force- and/or form-fitting contact. Preferably, the high-pressure window 30 has a length which extends from (inside) the pressure vessel wall 1a as far as the base piece 20 or as far as the inside of the base piece 20.

Preferably, the high-pressure window 30 is provided laterally adjacent to the microwave-permeable region 11, that is to say in particular such that there is a spacing between the high-pressure window 30 and the microwave-permeable region 11 in the horizontal direction. Preferably, the high-pressure window 30 is arranged in the vicinity of the inner side wall of the pressure vessel 1.

The material of the high-pressure window 30 is preferably permeable to infrared radiation in a wavelength range of the heat radiation from the sample P or the liquid 5, in particular in a wavelength range from 2.0 µm to 2.6 µm. In order that the high-pressure window 30 withstands the high pressures of the reaction chamber 2, the high-pressure window is preferably designed to have a strength which corresponds to the pressure vessel wall 1a, that is to say in particular to withstand pressures of up to at least 200 bar, preferably up to at least 500 bar. In order to accommodate the high pressures of the reaction chamber 2 particularly well, the material of the high-pressure window 30 may have a crystalline structure. It has been found that in particular sapphire, quartz, calcium fluoride and/or a PTFE material, in particular PTFE materials with pure $CF_3-(CH_2)_n$ structure (n=more than 1 000 000 C atoms), are suitable as material for the high-pressure window 30 for absorbing high pressures of the reaction chamber 2.

The pressure vessel 1 furthermore has an infrared temperature sensor 40 for temperature measurement or temperature monitoring (for example for temperature regulation). The infrared temperature sensor 40 is arranged so as to bear directly on the high-pressure window 30, or to be situated at least directly opposite the high-pressure window 30, from the outside, for example with a spacing between the high-pressure window 30 and the infrared temperature sensor 40. In this way, infrared radiation can pass through the high-pressure window 30 to the infrared temperature sensor 40 from the heated samples P in order for the temperature of the samples P to thereby be directly measured on the basis of the infrared radiation.

It can be seen that the infrared temperature sensor 40 is, via an intermediate piece 41, for example (as can be seen in FIG. 2) in the form of a receiving tube, able to be screwed and/or inserted into the pressure vessel wall 1a, in particular into the bore 31. Here, the intermediate piece or the receiving tube 41 is designed to receive the sensor head of the infrared temperature sensor 40 such that the infrared radiation can pass from the high-pressure window 30 to the infrared temperature sensor 40, or to the sensor head thereof, via a region of the intermediate piece 41, that is to say for example via the hollow body of the receiving tube. The distal end of the intermediate piece 41 may—as shown by way of example in FIG. 2—be at a distance from the high-pressure window 30. Alternatively, the distal end of the intermediate piece 41 may also extend as far as the high-pressure window 30. The intermediate piece 41, however, is not essential, and so the infrared temperature sensor 40 may also be screwed and/or inserted directly into the bore 31.

The pressure vessel 1 may furthermore have a cooling zone for cooling the infrared temperature sensor 40. The cooling zone is in this case preferably provided adjacent to the infrared temperature sensor 40, so that a flow of heat from the infrared temperature sensor 40 to the cooling zone is brought about. In the pressure vessel 1 shown by way of example in FIG. 2, cooling of the infrared temperature sensor 40 is brought about passively, specifically by means of a passage bore 42 provided in the intermediate piece 41. In this case, the passage bore 42 is however not restricted to being formed by the intermediate piece 41, and so other elements too, such as for example an (additional) tube, may have the passage bore 42. Here, the passage bore 42 preferably extends in a horizontal or (with respect to the infrared radiation) transverse direction and/or between the infrared temperature sensor 40 and the high-pressure window 30 or the pressure vessel wall 1a. The passage bore 42 will thereby bring about a flow running through the passage bore 42. In the example shown in FIG. 2, it is thus the case that heat will flow from the high-pressure window 30 through the intermediate piece 41 or receiving tube in the direction of the infrared temperature sensor 40, and subsequently be transported away from the infrared temperature sensor 40 by means of the flow through the passage bore 42. By means of said flow, it is therefore then possible for heat to be transported away from the infrared temperature sensor 40 in order for the infrared temperature sensor 40 to be cooled.

As an alternative or in addition to the passage bore 42, it is also possible for provision to be made of other active and/or passive cooling elements for cooling the infrared temperature sensor 40. Components which enlarge the heat-releasing surface of the infrared temperature sensor 40, that is to say for example cooling ribs, may be taken into consideration as a passive cooling element. Cooling elements which are operated in particular with (electrical) energy, in order thereby to transport away particularly large amounts of heat, may be taken into consideration as an active cooling element. For example, a flow device, preferably a fan, and/or a Peltier element may be used as an active cooling element. The active cooling element may form, together with the infrared temperature sensor 40, a unit, so as to bring about particularly space-saving active cooling as a consequence. For example, the active cooling element may be provided such that the flow brought about by said cooling element passes through the passage bore 42.

It may additionally be provided that the infrared temperature sensor 40 is formed integrally with the high-pressure window 30 as a unit. It may thus be provided for example that the unit is able to be screwed into the bore 31 by way of a thread provided in particular on the high-pressure window 30, preferably also a thread provided on the infrared temperature sensor 40.

Here, the invention is not restricted to the features described above. In particular, all of the features described above may be combined with one another in any desired manner.

The invention claimed is:

1. A pressure vessel (1) having a temperature measuring capability, said pressure vessel (1) comprises: a pressure vessel wall (1a) which completely surrounds a reaction chamber (2) as a pressure space for the initiation and/or promotion of chemical and/or physical pressure reactions of a sample (P) to be heated which is accommodated in the reaction chamber (2), wherein the pressure vessel wall (1a) has an infrared-permeable high-pressure window (30), which is configured to withstand pressures up to at least 200 bar, which extends away outward in a direction from the reaction chamber (2) and which is supported in the pressure vessel wall (1a) by a bore (31) which is open toward the reaction chamber (2) and comprises a step having an increased diameter to support the high-pressure window (30) with respect to a pressure in the reaction chamber (2), wherein the pressure vessel (1) furthermore has an infrared temperature sensor (40) which is situated directly opposite the high-pressure window (30), in order to measure the temperature of a sample (P), accommodated in the reaction chamber (2), during a pressure reaction through the high-pressure window (30).

2. The pressure vessel (1) according to claim 1, wherein the high-pressure window (30) bears directly against the reaction chamber (2).

3. The pressure vessel (1) according to claim 1, wherein the bore (31) is a passage bore which leads to the outside of the pressure vessel (1), with the result that the high-pressure window (30) is able to be inserted into the bore (31) from outside the pressure vessel (1) so as to extend away outward.

4. The pressure vessel (1) according to claim 1, wherein the high-pressure window (30) and/or infrared temperature sensor (40) are/is designed to be screwed and/or inserted into the pressure vessel wall (1a).

5. The pressure vessel (1) according to claim 1, wherein the infrared temperature sensor (40) has an intermediate piece (41), for example a receiving tube, for receiving a sensor head of the infrared temperature sensor (40).

6. The pressure vessel (1) according to claim 5, wherein the distal end of the intermediate piece (41) extends as far as the high-pressure window (30) or is at a distance from the high-pressure window (30).

7. The pressure vessel (1) according to claim 5, wherein the intermediate piece (41) is designed to be screwed and/or inserted into the bore (31).

8. The pressure vessel (1) according to claim 1, wherein the pressure vessel wall (1a) has a microwave-permeable region (11) for the coupling-in of microwaves, wherein the high-pressure window (30) and/or the infrared temperature sensor (40) are/is provided adjacent to the microwave-permeable region (11).

9. The pressure vessel (1) according to claim 1, wherein the high-pressure window (30) and the infrared temperature sensor (40) are formed as a unit or integrally.

10. The pressure vessel (1) according to claim 1, wherein the material of the high-pressure window (30) is permeable to infrared radiation in a wavelength range from 2.0 µm to 2.6 µm.

11. The pressure vessel (1) according to claim 1, wherein the material of the high-pressure window (30) has a crystalline structure.

12. The pressure vessel (1) according to claim 1, wherein the material of the high-pressure window (30) comprises sapphire, quartz, calcium fluoride and/or a PTFE material.

13. The pressure vessel (1) according to claim 1, further comprising a cooling zone for cooling the infrared temperature sensor (40).

14. The pressure vessel (1) according to claim 13, wherein the cooling zone is configured to cool the infrared temperature sensor (40) actively and/or passively.

15. The pressure vessel (1) according to claim 13, wherein the cooling zone has a flow device for cooling the infrared temperature sensor (40).

16. The pressure vessel (1) according to claim 15, wherein the flow device is a fan.

17. The pressure vessel (1) according to claim 13, wherein the cooling zone has a Peltier element for cooling the infrared temperature sensor (40).

18. The pressure vessel (1) according to claim 13, wherein the cooling zone has a tube which receives the infrared temperature sensor (40), wherein the tube has a passage bore which is provided such that, by way of the passage bore, an air flow is established for the cooling of the infrared temperature sensor (40).

19. The pressure vessel (1) according to claim 18, wherein the tube is the intermediate piece (41).

* * * * *